United States Patent [19]
Jordine

[11] Patent Number: 5,725,606
[45] Date of Patent: Mar. 10, 1998

[54] AZO DYE MIXTURES AND THE USE THEREOF

[75] Inventor: Guido Jordine, Freiburg, Germany

[73] Assignee: Ciba Specialty Chemicals Corporation, Tarrytown, N.Y.

[21] Appl. No.: 635,813

[22] Filed: Apr. 22, 1996

[30] Foreign Application Priority Data

Apr. 26, 1995 [CH]  Switzerland ............. 1194/95

[51] Int. Cl.$^6$ ............. D06P 3/06; D06P 3/16
[52] U.S. Cl. ............. 8/641; 8/682; 8/683; 8/917; 8/924
[58] Field of Search ............. 8/639, 641, 918-325, 8/682, 683, 696

[56] References Cited

U.S. PATENT DOCUMENTS

| | | | |
|---|---|---|---|
| 4,163,013 | 7/1979 | Hugl et al. ............. | 260/206 |
| 4,179,267 | 12/1979 | Lacroux et al. ............. | 8/41 R |
| 4,622,045 | 11/1986 | Frauenknecht et al. ............. | 8/531 |
| 5,131,919 | 7/1992 | Mausezahl ............. | 8/643 |
| 5,234,467 | 8/1993 | Schaetzer ............. | 8/641 |

FOREIGN PATENT DOCUMENTS

| | | |
|---|---|---|
| 627485 | 1/1982 | Switzerland . |
| 1466069 | 3/1977 | United Kingdom . |

OTHER PUBLICATIONS

Chemical Abstracts, vol. 100, abstract No. 211638K.
Chemical Abstracts, vol. 100, abstract No. 87230.

*Primary Examiner*—Margaret Einsmann
*Attorney, Agent, or Firm*—David R. Crichton; Kevin T. Mansfield

[57] ABSTRACT

Dye mixtures comprising at least one dye of formula

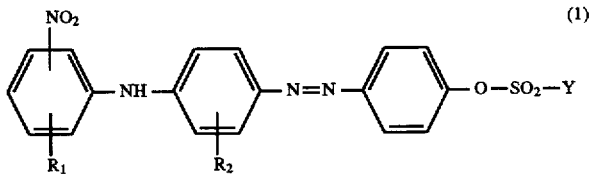

together with at least one dye of formula

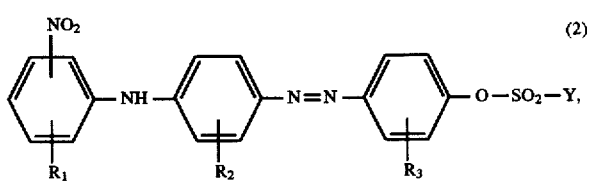

wherein $R_1$ and $R_2$ are each independently of the other hydrogen, $C_1$–$C_4$alkyl, $C_1$–$C_4$alkoxy, $C_2$–$C_4$-alkanoylamino, halogen or sulfo, $R_3$ is $C_1$–$C_4$alkyl, $C_1$–$C_4$alkoxy, $C_2$–$C_4$alkanoylamino, halogen or sulfo, and Y is $C_1$–$C_4$alkyl or phenyl or naphthyl, each of which is unsubstituted or substituted by $C_1$–$C_4$alkyl, $C_1$–$C_4$alkoxy, $C_2$–$C_4$alkanoylamino, halogen or sulfo, which dye mixtures contain at least 10% by weight of one or more than one dye of formula (1), based on the total amount of the dyes of formulae (1) and (2), dye nitrogen-containing or hydroxyl group-containing fiber materials with good properties.

6 Claims, No Drawings

AZO DYE MIXTURES AND THE USE THEREOF

The present invetention relates to mixtures of azo dyes as well as to the use thereof for dyeing or printing nitrogen-containing or hydroxyl group-containing fibre materials.

It is the object of this invention to provide dye mixtures suitable for dyeing or printing nitrogen-containing or hydroxyl group-containing fibre materials, in particular natural or synthetic polyamide fibre materials, having good fastness properties as well as, in particular, good solubility and good printing paste stability.

It has now been found that the following dye mixtures substantially meet these requirements.

The invention relates to dye mixtures comprising at least one dye of formula

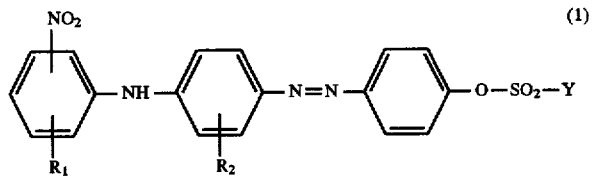

together with at least one dye of formula

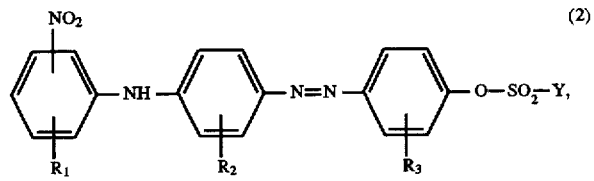

wherein $R_1$ and $R_2$ are each independently of the other hydrogen, $C_1$–$C_4$alkyl, $C_1$–$C_4$alkoxy,
$C_2$–$C_4$alkanoylamino, halogen or sulfo, $R_3$ is $C_1$–$C_4$alkyl, $C_1$–$C_4$alkoxy, $C_1$–$C_4$alkanoylamino, halogen or sulfo, and Y is $C_1$–$C_4$alkyl or phenyl or naphthyl, each of which is unsubstituted or substituted by
$C_1$–$C_4$alkyl, $C_1$–$C_4$alkoxy, $C_2$–$C_4$alkanoylamino, halogen or sulfo, which dye mixtures contain at least 10% by weight of one or more than one dye of formula (1), based on the total amount of the dyes of formulae (1) and (2).

$R_1$, $R_2$ and $R_3$ defined as $C_1$–$C_4$alkyl and the corresponding substituent of Y may suitably be methyl, ethyl, propyl, isopropyl, butyl, isobutyl, sec-butyl or tert-butyl. Methyl or ethyl are preferred and methyl is most preferred.

$R_1$, $R_2$ and $R_3$ defined as $C_1$–$C_4$alkoxy and the corresponding substituent of Y may suitably be e.g. methoxy, ethoxy, propoxy, isopropoxy, butoxy, sec-butoxy, isobutoxy or tert-butoxy. Methoxy is preferred.

$R_1$, $R_2$ and $R_3$ defined as $C_2$–$C_4$alkanoylamino and the corresponding substituent of Y may suitably be e.g. propionylamino or, preferably, acetylamino.

$R_1$, $R_2$ and $R_3$ defined as halogen and the corresponding substituent of Y may suitably be e.g. fluoro or bromo and, preferably, chloro.

$R_1$ is preferably hydrogen or sulfo. Sulfo is most preferred.

$R_2$ is preferably hydrogen, $C_1$–$C_4$alkyl, $C_1$–$C_4$alkoxy or sulfo. Hydrogen or sulfo are more preferred and hydrogen is most preferred.

$R_3$ is preferably $C_1$–$C_4$alkyl, $C_1$–$C_4$alkoxy or sulfo and, more preferably, $C_1$–$C_4$alkyl or sulfo. $R_3$ is preferably $C_1$–$C_4$alkyl, more preferably methyl or ethyl. Methyl is most preferred.

Y is preferably $C_1$–$C_4$alkyl radicals or phenyl radicals, more preferably phenyl radicals which can be substituted as indicated above. Substituents of Y may preferably be hydrogen, $C_1$–$C_4$alkyl, $C_1$–$C_4$alkoxy or sulfo, more preferably $C_1$–$C_4$alkyl. Preferred substituents of Y are methyl or ethyl. Methyl is most preferred.

Y is particularly preferably phenyl which is unsubstituted or substituted by $C_1$–$C_4$alkyl, $C_1$–$C_4$alkoxy or sulfo, more preferably by $C_1$–$C_4$alkyl. Y is very particularly preferably phenyl which is unsubstituted or substituted by methyl or ethyl, preferably by methyl.

In the dyes of formulae (1) and (2) those substituents which are equally named may have identical or different meanings. Said substituents preferably have the same meanings.

The dyes of formulae (1) and (2) preferably comprise at least one sulfo group, more preferably only 1 or 2 sulfo groups. Said dyes most preferably comprise only one sulfo group.

Preferred dye mixtures are those wherein $R_1$ is sulfo, $R_2$ is hydrogen, $R_3$ is $C_1$–$C_4$alkyl, preferably methyl or ethyl and, more preferably, methyl, and Y is phenyl which is unsubstituted or substituted as indicated above, preferably by $C_1$–$C_4$alkyl.

Particularly preferred dye mixtures are those comprising as dye of formula (1) a dye of formula

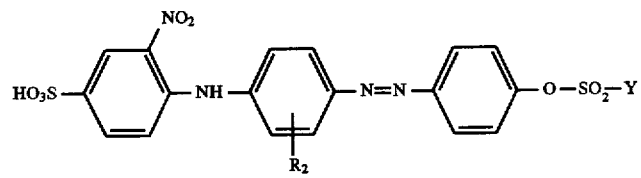

and as dye of formula (2) a dye of formula

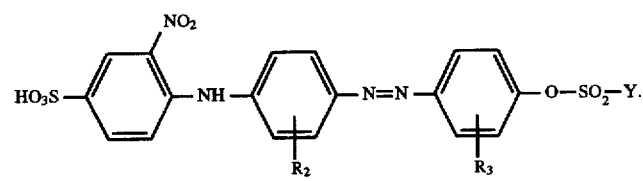

$R_2$, $R_3$ and Y have the meanings and preferred meanings indicated above.

Very particularly preferred dye mixtures are those comprising at least one dye of formula

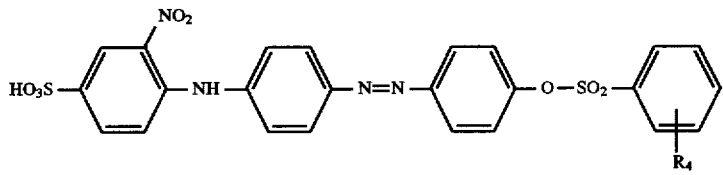

(5)

together with at least one dye of formula

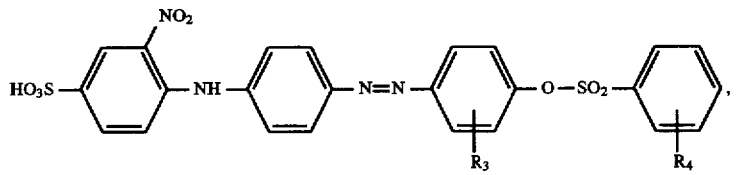

(6)

wherein $R_3$ has the meanings and preferred meanings indicated above and $R_4$ is hydrogen, $C_1$-$C_4$alkyl, $C_1$-$C_4$alkoxy, $C_2$-$C_4$alkanoylamino, halogen or sulfo, preferably $C_1$-$C_4$alkyl. $R_3$ and $R_4$ are preferably $C_1$-$C_4$alkyl, more preferably methyl. $R_4$ is preferably in para-position relative to the group of formula —$OSO_2$—.

Particularly interesting dye mixtures are those containing at least 20% by weight, preferably at least 30% by weight and, more preferably, at least 40% by weight, of one or more than one dye of formula (1), based on the total amount of the dyes of formulae (1) and (2).

Dyes of formulae (1) and (2) can typically be obtained by reacting a compound of formula

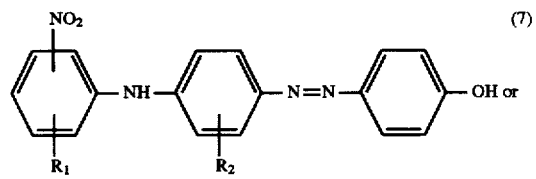

(7)

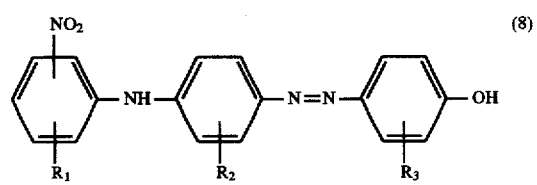

(8)

with a compound of formula

hal-$SO_2$—Y (9), wherein $R_1$, $R_2$, $R_3$ and Y have the meanings indicated above and hal is halogen, preferably chloro.

The reaction of the compound of formula (7) or (8) with a compound of formula (9) is typically carried out in an aqueous medium at a pH of typically 9 to 12 and in the temperature range from e.g. 60° to 100° C. Acid released during the reaction is preferably caught by acid-binding agents, such as sodium hydroxide, conveniently while keeping the pH above 5, preferably at 6.

It is also possible to obtain mixtures of the dyes of formulae (1) and (2) direct by using compounds of formulae (7) and (8) concurrently during the reaction at a corresponding ratio.

The compounds of formulae (7), (8) and (9) are known or can be prepared in general accordance with known compounds.

The dye mixtures of this invention can also be prepared by mixing the individual dyes. This mixing process is typically carried out in suitable mills, e.g. ball mills and pin mills, and also in kneaders or mixers.

The dye mixtures can also be prepared by e.g. spray drying the aqueous dye mixtures.

The dyes of formulae (1) and (2) are usually either in the form of their free sulfonic acid or, preferably, in the form of the salts thereof.

Suitable salts are typically the alkali metal salts, alkaline earth metals salts or ammonium salts, or the salts of an organic amine. Illustrative examples are the sodium, lithium, potassium or ammonium salts or the salt of mono-, di- or triethanolamine.

The dye mixtures of this invention may contain further auxiliaries, typically sodium chloride or dextrine.

The dye mixtures of this invention can be used in the conventional dyeing and printing processes. In addition to water and the dyes, the dye liquors or printing pastes can contain further auxiliaries, typically wetting agents, antifoams, levelling agents or agents influencing the properties of the textile material, such as softeners, auxiliaries for the provision of a flame retarding finishing, or dirt, water and oil repellents as well as water softeners, and natural or synthetic thickeners, typically alginates or cellulose ethers.

The novel dye mixtures are also suitable for dyeing from short liquors, for example in the continuous dyeing processes or in the batchwise or continuous froth dyeing processes.

The dye mixtures of this invention are distinguished in particular by good exhaust properties, good solubility and printing paste stability as well as by good compatibility. The novel dye mixtures also have good resistance to hard water.

Level dyeings are obtained having good allround fastness properties, in particular good fastness to rubbing, wet treatments, wet-rubbing and light.

The dye mixtures of this invention are suitable for dyeing or printing natural polyamide materials such as wool or, in particular, synthetic polyamide materials, typically polyamide 6 or polyamide 66, or silk, and are suitable for dyeing or printing wool and synthetic polyamide blends and yarns.

The cited material, in particular textile material, can be in any form of presentation, e.g. in the form of fibres, yarns, wovens or knits and, in particular, carpets.

In the following Examples, parts are parts by weight. Temperatures are given in degrees Celsius. The ratio of parts by weight and parts by volume is the same as that of the gram to the cubic centimeter.

Example 1: 105 Parts of a compound of formula

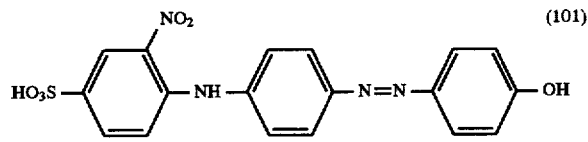

and 105 parts of a compound of formula

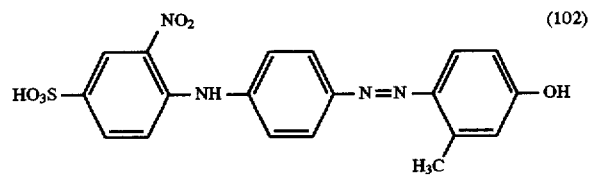

are added to 4200 parts of water, heated to 80° C. and the mixture is adjusted to pH 11 with concentrated sodium hydroxide solution. 165 parts of tosyl chloride are then added incrementally over 15 minutes and the pH decreases. At 6.5, the pH is kept constant with concentrated sodium hydroxide solution and the mixture is stirred for 4 hours at 80° C. Subsequently, 10% by volume of sodium chloride are added and the reaction mixture is cooled to 50° C. The product obtained is collected by suction filtration, washed with 1000 parts of an aqueous solution of sodium chloride (10%) and then with 1000 parts of an aqueous solution of sodium chloride (5%) and subsequently dried at 60° C., giving 285 parts of a mixture containing the dyes of formulae

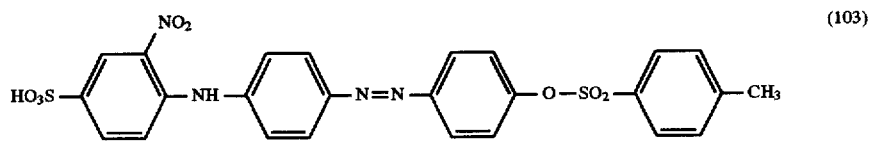

and

at a weight ratio of c. 1:1. The resulting dye mixture of the dyes of formulae (103) and (104) dyes wool or synthetic polyamide fibre material in a yellow shade.

Example 2: Example 1 is repeated, but replacing 105 parts of a compound of formula (102) with 105 parts of a compound of formula

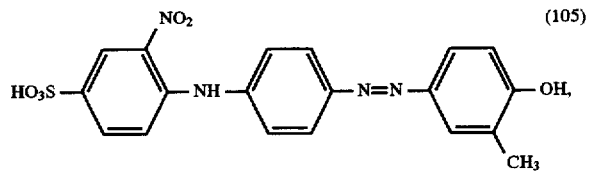

to give an analogous dye mixture which dyes wool or synthetic polyamide fibre material in a yellow shade.

Examples 3 to 12: Example 1 or 2 is repeated, but using the compounds of formulae (101) and (102) or the compounds of formulae (101) and (105) at a weight ratio of 1:9, 2:8, 3:7, 4:6 or 6:4, giving analogous dye mixtures which dye wool or synthetic polyamide fibre material in a yellow shade.

Dyeing Instruction I 10 parts of polyamide 66 fabric are dyed in 500 parts of an aqueous liquor containing 2 g/l of ammonium acetate and which is adjusted to pH 5 with acetic acid. The amount of dye mixture of Example 1 is 1%, based on the weight of the fibre. The dyeing time is 30° to 90° minutes at 98°. The dyed polyamide 66 fabric is then taken out of the liquor and washed and dried as usual.

Dyeing Instruction II 10 parts of polyamide 66 fabric are dyed in 500 parts of an aqueous liquor containing 1 g/l of monosodium phosphate and which is adjusted to pH 6 with disodium phosphate. The mount of dye mixture of Example 1 is 1%, based on the weight of the fibre. The dyeing time is 30 to 90 minutes at 98°. The dyed polyamide 66 fabric is then taken out of the liquor and washed and dried as usual.

Dyeing Instruction III 10 parts of wooden piece goods are dyed in 500 parts of an aqueous liquor. The liquor contains 1% of the dye mixture of Example 1, 5% of calcined Glauber's salt and 2% of 80% acetic acid, based on the weight of the fibre. The dyeing time is 30 to 60 minutes at 98°.

What is claimed is:

1. A dye mixture, comprising at least one dye of formula

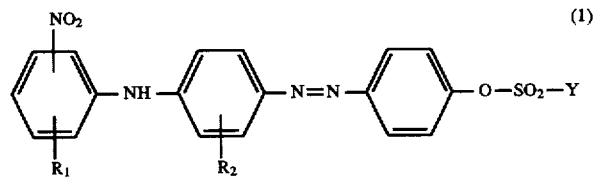

together with at least one dye of formula

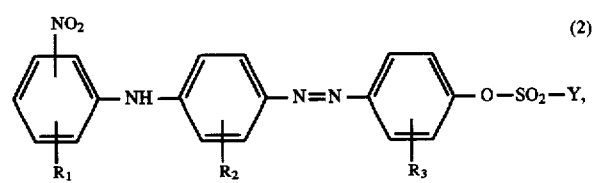

wherein $R_1$ is sulfo, $R_2$ is hydrogen, $R_3$ is $C_1$-$C_4$alkyl, and Y is phenyl which is unsubstituted or substituted by $C_1$-$C_4$alkyl, which dye mixture contains at least 10% by weight of one or more than one dye of formula (1), based on the total amount of the dyes of formulae (1) and (2).

2. A dye mixture according to claim 1, comprising at least one dye of formula

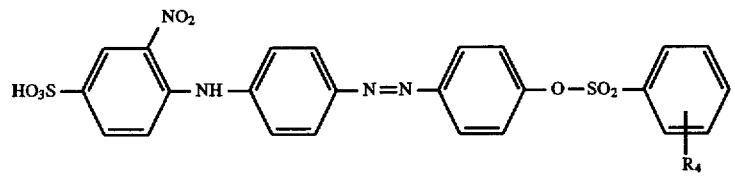

together with at least one dye of formula

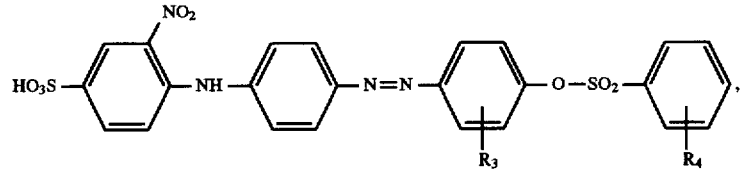

wherein $R_3$ and $R_4$ are $C_1$-$C_4$alkyl.

3. A dye mixture according to claim 1, containing at least 20 % by weight of one or more than one dye of formula (1), based on the total amount of the dyes of formulae (1) and (2).

4. A dye mixture according to claim 1, containing at least 30 % by weight of one or more than one dye of formula (1), based on the total amount of the dyes of formulae (1) and (2).

5. A process for dyeing or printing hydroxyl group-containing or nitrogen-containing fibre material, which process comprises the step of applying to said fibre material a tinctorial amount of a dye mixture according to claim 1.

6. A process according to claim 5, wherein said fibre material is natural or synthetic polyamide fibre material.

* * * * *